United States Patent [19]

Sylvest

[11] Patent Number: 4,810,446
[45] Date of Patent: Mar. 7, 1989

[54] METHOD OF MAKING STRAW BRIQUETTES

[76] Inventor: Hans E. Sylvest, Lille Havelse 14, 3220 Skaevinge, Denmark

[21] Appl. No.: 897,428

[22] Filed: Aug. 18, 1986

[30] Foreign Application Priority Data

Aug. 19, 1985 [DK] Denmark .............................. 3748/85

[51] Int. Cl.$^4$ .......................... B27J 7/00; B29C 43/02
[52] U.S. Cl. .................................... 264/122; 264/124; 44/15 D
[58] Field of Search ....................... 264/109, 122, 124; 106/162, 163.1; 44/10 A, 15 R, 15 D, 1 D

[56] References Cited

U.S. PATENT DOCUMENTS

| | | | |
|---|---|---|---|
| 806,868 | 12/1905 | Bunker | 44/10 A |
| 2,319,182 | 11/1938 | Van der Pyl | 106/163.1 |
| 2,779,683 | 1/1957 | Gill | 264/124 |
| 2,976,164 | 3/1961 | Glab | 264/124 |
| 2,984,579 | 5/1961 | Glab | 264/124 |
| 2,984,580 | 5/1961 | Glab | 264/124 |
| 3,013,880 | 12/1961 | King | 264/124 |
| 3,252,815 | 5/1966 | Glab | 264/124 |
| 4,314,825 | 2/1982 | Paquette | 44/10 A |
| 4,398,917 | 8/1983 | Reilly | 264/109 |
| 4,519,808 | 5/1985 | Stisen | 44/10 A |

FOREIGN PATENT DOCUMENTS

| | | | |
|---|---|---|---|
| 83/00051 | 11/1983 | Denmark | 44/10 A |
| 3320087 | 12/1984 | Fed. Rep. of Germany | 44/10 A |

*Primary Examiner*—James Lowe
*Assistant Examiner*—Jeremiah F. Durkin, II
*Attorney, Agent, or Firm*—Christel, Bean & Linihan

[57] ABSTRACT

Procedure for the manufacture of briquettes or pills for stoking made of stems from grain or straw or similar cellulosic waste material with the admixture of a binding agent. Compressing, principally by trace or piston pressing, at a pressure temporarily raising the temperature in the straw briquette to an area between 75° C. and 200° C., characterized by mixing stems with straw or similar waste material from pulses and/or protein plants to be used as binding agent.

11 Claims, No Drawings

METHOD OF MAKING STRAW BRIQUETTES

BACKGROUND OF THE INVENTION

The invention is a procedure for the manufacture of briquettes or pills for stoking made of stems from grain or straw or similar cellulosic waste material with the admixture of a binding agent during compression, principally by trace or piston pressing, at a pressure temporarily raising the temperature in the straw briquette to an area between 75° C. and 200° C.

Such procedures are known, e.g. from DK patent specification No. 148.119 describing a procedure for the manufacture of compressed straw briquettes for stoking, which is peculiar in that for its binding agent it uses hydrous sludge containing organic material, notably sludge from sewage purification or biological gas recovery. The advantage stated for this invention is especially the removal of sludge by means of straw briquettes and the exploitation of the calorific value of the organic content of the sludge, while the structure or deformation resistance of the briquette appear to be of less importance. Not surprisingly, such briquettes have proved unsuitable for transport because they lack deformation resistance properties. The briquettes frequently crumble at the smallest physical degree of stress, e.g. when stored in piles.

From DK patent application No. 90/84 it is known that a binding agent can be used for the stabilization of the deformation resistance of the briquette for the purpose of transport over relatively long distances. According to the latter application the binding agent is made up of fly ash, which, compared with other known binding agents is a cheap waste substance, which can even absorb a slightly increased moisture content in the straw. The drawbacks in using fly ash include the fact that the mineral content of fly ash involves a heavy mechanical wear on plungers and other parts in the manufacturing process and that the content of waste matter of the fly ash is not controllable with a view to substances polluting the environment. This, again, makes it inadvisable to use the ashes for fertilization.

From DK patent application No. 4471/81 we know of fuel briquettes or pills, which as binding agent uses the substance of tallbek in an amount corresponding to 1-10 weight percent. According to the application this binding agent should cause the effect that the briquette burns with a flame. Again, the drawback in this binding agent is that tallbek fails to ensure deformation resistance in the briquette sufficient enough to let the briquettes travel over long distances.

As tallbek is an oily product with a content of high fatty acids, resinous acids, esters and unsaponifiable substances, this matter does not correlate very well with the press during the manufacture of the briquettes or the pills, since tallbek, which only becomes thin at 80° to 90° C., glues together during cooling and deposits in the matrix and in the cooling stretch. Finally, it should be stated that tallbek is a material which has to be bought, which will often put a strain on a nation's balance of payments.

It is furthermore a known practice to use lignosulphonate under the trade name of WAFOLIN® as a binding agent. This substance produces poorly coherent briquettes, which easily crumble. Moreover, lignosulphonate has a sulphur content of about 5 percent so the use of lignosulphonate will result in an increased emission of sulphur.

A common feature of the known binding agents is that they all require a hydrous content between 12 and 16 percent in the straw, i.e. very dry straw. Under north-european climatic conditions drying to such a low hydrous content is seldom possible in the field before collecting the straw, and it has indeed turned out that most of the straw used for pressing briquettes has to be dehydrated before being used for briquettes. This dehydration process in itself is energy-consuming and comparatively cost-demanding so as to lower the total energy output of straw.

It is the object of the present invention to provide a procedure for the manufacture of briquettes or pills made of straw or similar cellulosic waste material with a hydrous content even greater than 16 percent using a binding agent to ensure a briquette of structural stability which will sustain transportation over long distances, and that this binding agent shall not have inherent secondary effects in the form of e.g. increased wear on plunger or matrix, neither should it contain environmental pollutants. Furthermore, together with the fuel, the binding agent must be capable of going into a cycle in agriculture, in which e.g. the ashes from the incineration can be used as a supplementary fertilizer.

SUMMARY OF INVENTION

By a procedure for the manufacture of briquettes or pills for stoking made of stems from grain or straw or similar cellulosic waste material with the admixture of a binding agent during compression, principally by trace or piston pressing, at a pressure temporarily raising the temperature in the straw briquette to an area between 75° C. and 200° C., and to ensure a briquette of structural stability capable of being transported over long distances, a procedure is suggested in which a binding agent is used applicable in connection with straw with a hydrous content of up to 24 percent and not having inherent secondary effects in the form of e.g. increased wear on plunger and matrix, neither containing environmental pollutants and which shall be useable in a natural cycle in agriculture, e.g. in the form of a supplementary fertilizer.

This object is achieved by admixing straw from pulses or protein plants as a binding agent. The straw from pulses and protein plants has a protein content of between 30 and 40 g/kg. This protein is utilized during compression at the high temperature together with the hydrous content of the straw, which causes a coagulation of the proteins, which in this way bind the straw briquettes to a briquette of stable form, which has a relatively large degree of resistance to physical stress. By this procedure it is possible to use straw with a hydrous content up to 75 per cent larger than previously without consequently causing a deterioration of the quality of the produced briquette.

DETAILED DESCRIPTION OF INVENTION

According to the invention this object is achieved by admixing straw and similar waste material from pulses and protein plants to be used as a binding agent. Straw from pulses and protein plants has a protein-content of between 30 and 40 g/kg. This protein is utilized during compression at the high temperature together with the hydrous contents in the straw thus producing a coagulation of the proteins, which thereby bind the straw briquettes to a briquette of stable form having a relatively large resistance to physical stress. The most important feature of the specified binding agent is partly that it is possible to use straw with a hydrous content up to 75 percent higher than previously without causing any deterioration of quality in the produced briquette, partly that it does not involve any abnormal wear on the plunger or the matrix. Besides, in its coagulated state, the binding agent acts as a lubricant between the straw and the matrix.

The residue from burning the straw briquettes is ashes which do not contain environmental pollutants, e.g. in the form of heavy metals, as all matters which are used for the manufacture of the straw briquettes may be found among the surplus production of an ordinary farm. This makes it only natural to use the ashes for fertilizing, from which it can be seen that a cycle is provided for the constituents of the briquettes.

It has proved particularly appropriate to use straw from the production of peas and lupines as the binding agent. In so doing, the relatively large amount of pulses' straw stemming from the growing of leguminous plantsis also turned to account. In frequently grown sorts the raw protein content is between 30 and 40 g/kg straw. For the binding agent to work effectively, it must be added in an amount of up to 10 percent, mainly 5 percent.

A particularly surprising effect of the procedure according to the invention is that the hydrous content of the straw is allowed to vary from 16 to 30 percent, which has so far been prohibitive to the compression of straw briquettes. This is owing to the fact that when moist straw is being compressed into briquettes steam pockets arise which will impair the briquettes and produce poor cohesion. The larger hydrous content is probably explicable by the hydrous content of the straw in connection with the protein content of the binding agent creating a stable bond.

The following example is quoted to illuminate the invention:

Straw having a hydrous content of 24 percent was finely cut in a shredding machine of the FARMHAND type to a cut size between 1 and 3 cm. In a mixing chamber comminuted pea straw is admixed after which the mixture is conducted to a eccentric press of the C. F. Nielsen brand, this press having proved adequately sturdy for the compression of straw briquettes. The action and operating conditions of such a press are well-known and so any description has been left out. The compressed briquettes are ejected from the press in one continuous string at a temperature of about 70° C. and are conducted along a cooling stretch to the stockyard, where the briquettes break off by free fall.

The produced straw briquettes have a dry solid content of abt. 92 percent with a calorific value of around 4310 kcal/kg or 18045 kJ/kg. The stated values are very uncertain, dependent heavily as they do on the time of year, climate, sort and constitution of the soil.

I claim:

1. Procedure for the manufacture of briquettes or pills for stoking and subsequently useable in a natural cycle in agriculture made of compressed stems from grain or straw or similar cellulosic waste material having a hydrous content up to 30 percent with admixed binding agent, compressing, by trace or piston pressing, at a pressure temporarily raising the temperature in the straw briquette to a range between 75° C. and 200° C., characterized by mixing stems with straw or similar waste material from pulses and/or protein plants to be used as said binding agent, said compression in said temperature area together with said hydrous content of said cellulosic waste material causing coagulation of the protein in said binding agent to bind the briquettes to a stable form resistant to physical stress.

2. Procedure according to claim 1, characterized by the use of comminuted straw from peas or lupines as the binding agent.

3. Procedure according to claims 1 or 2, characterized by adding the binding agent in an amount of up to 10 percent.

4. Procedure according to claims 1 or 2, characterized by the hydrous content of the straw stems being between 16 and 30 percent.

5. Procedure according to claim 3, characterized by adding the binding agent in an amount of 5 percent.

6. Procedure to claim 4, characterized by the hydrous content of the straw stems being between 18 and 23 percent.

7. Procedure according to claims 1 or 2 wherein the protein content of the binding agent is between 30 g/kg. and 40 g/kg.

8. Procedure for the manufacture of briquettes or pills for stoking and subsequently useable in a natural cycle in agriculture made of compressed stems from grain or straw or similar cellulosic waste material having a hydrous content up to 30 per cent with admixed binding agent, compressing, by trace or piston pressing, at a pressure temporarily raising the temperature in the straw briquette in a range between 75° C. and 200° C., characterized by mixing stems with straw or similar waste material from pulses and/or protein plants to be used as said binding agent, said binding agent having a protein content between 30 g/kg and 40 g/kg and being added in an amount up to 10 percent, said compression in said temperature range together with the hydrous content of said cellulosic waste material causing coagulation of the protein in said binding agent to bind the briquettes to a stable form resistant to physical stress.

9. Procedure according to claim 8, characterized by adding the binding agent in an amount of 5 percent.

10. Procedure according to claims 8 or 9, characterized by the hydrous content of the straw stems being between 18 and 23 percent.

11. Procedure according to claims 8 or 9, characterized by the use of comminuted straw from peas or lupines as the binding agent.

* * * * *